United States Patent Office 3,533,831
Patented Oct. 13, 1970

3,533,831
METHOD OF BONDING OLEFIN ELASTOMER TO TEXTILE FIBER AND BONDED PRODUCT
Luigi Torti and Guido Bertelli, Ferrara, Italy, assignors to Montecatini Edison S.p.A., Milan, Italy, a corporation of Italy
No Drawing. Filed Oct. 10, 1967, Ser. No. 674,122
Claims priority, application Italy, Oct. 14, 1966, 28,860/66
Int. Cl. B44d 1/14; B32b 25/02
U.S. Cl. 117—76      11 Claims

ABSTRACT OF THE DISCLOSURE

Process for bonding elastomeric saturated ethylene/alpha-olefin copolymer or ethylene/alpha-olefin/polyene terpolymer of low degree of unsaturation to natural or synthetic fibers of fabric and the bonded product. Process involves treating the fibers or fabric with aqueous dispersion containing ethylene/propylene/polyene terpolymer of high degree of unsaturation and phenol-formaldehyde resin, drying the treated fabric; placing the fabric in contact with a composition of the elastomer containing a vulcanizing agent; and heating the assembled product to vulcanize the elastomer.

BACKGROUND OF THE INVENTION

Field of the invention

The present invention relates to a process for bonding natural or synthetic fibers to a saturated elastomeric ethylene/alpha-olefin copolymer or to a low-unsaturation ethylene/alpha-olefin/polyene terpolymer and to the formed articles thereby produced. More particularly it relates to a process for bonding said elastomeric polymers to fabrics, filaments and cord, of rayon, nylon, polyesters, cellulose fibers and the like.

Description of the prior art

Synthetic elastomeric products of saturated ethylene/alpha-olefin copolymers or low-unsaturation ethylene/alpha-olefin/polyene terpolymers are known in the art, particularly the copolymers of ethylene with propylene and the terpolymers of ethylene with propylene a non-conjugated cyclic or acyclic diene or triene. These polymers are produced with well-known catalytic systems based on transition metal compounds and organo-metallic compounds and are characterized by a prevailingly amorphous structure and the absence of polar substituents or reactive sites, which gives their vulcanized products excellent resistance to ageing, oxidation and chemical attack, but makes it extremely difficult to bond these elastomers to other types of rubber or to natural or synthetic textile fibers.

A known process for bonding an unsaturated terpolymer of ethylene, propylene and a nonconjugated diene such as dicyclopentadiene or 1,4-hexadiene, to textile fibers comprises the treatment of the fibers with a condensed resorcinol-formaldehyde resin, either alone or in combination with a rubber latex. In this process, the amount of solids deposited on the fiber by the aforesaid treatment must not exceed 4% by weight of the untreated fiber, and the weight ratio of rubber. (in the optional latex) to resorcinol-formaldehyde resin must not be higher than 4:1.

The rubber latexes which may be employed in combination with the phenol-formaldehyde resin, in the above process include the latexes of: natural rubber; butadiene/styrene copolymers; butadiene/vinylpyridine or butadiene/vinylpyridine/styrene copolymers; isobutene/isoprene copolymers; and ethylene/propylene/nonconjugated diene terpolymers. However, it has been experimentally found that this process fails to produce satisfactory adhesion between the textile fiber and the terpolymers vulcanizable with sulfur and accelerators when dispersions of low-unsaturation ethylene/propylene/nonconjugated diene terpolymers and the resorcinol-formaldehyde resin are employed.

In copending application Ser. No. 674,132 filed Oct. 10, 1967, having the title, "Method of Bonding Olefin Elastomer to Textile Fiber and Product Obtained," a process is described which produces good adhesion between textile fibers and saturated ethylene/alpha-olefin copolymers or low-unsaturation ethylene/alpha-olefin/polyene terpolymers by treating the aforesaid fibers with adhesive mixtures comprising an aqueous dispersion of phenol-formaldehyde resin and a low-unsaturation ethylene/propylene/nonconjugated diene terpolymer modified by halogenation or chlorosulfonation. However, to obtain satisfactory adhesion values, it is necessary to halogenate or chlorosulfonate said low-unsaturation terpolymer, thereby supplying it with polar groups prior to its use in the latex. Dispersions of phenol-formaldehyde resin and low-unsaturation terpolymers without such added polar groups, on the contrary, give adhesion values which are unsatisfactory for most practical purposes.

SUMMARY

The problem of obtaining effective adhesion between textile fibers and elastomers, especially under severe stress and temperature conditions, is of particular importance in the manufacture of tires, conveyor belts and transmission belts, as well as more generally in the manufacture of rubber-coated fabrics and products in which it is desirable to bond together a natural or synthetic fibrous support and an elastomeric material.

It has now been found that very high values of adhesion between textile fibers and low-unsaturation olefin terpolymers or saturated olefin copolymers are obtained by treating the fibers with an aqueous dispersion of an ethylene/propylene/unconjugated polyene terpolymer and a phenol-formaldehyde resin, and subsequently vulcanizing the assembled layers, the terpolymer being characterized by a high degree of unsaturation and a low propylene content.

Terpolymers of the composition used herein have not been described in the literature. Furthermore, unsatisfactory adhesion results obtained with dispersions of known low-unsaturation terpolymers without polar substituents make it surprising that a simple variation in the relative amounts of the monomers would so radically alter the adhesive properties of latexes prepared therefrom.

DESCRIPTION OF THE PREFERRED EMBODIMENTS

The present invention relates to a process for the adhesive bonding of natural or synthetic fibers to vulcanizable compositions of a saturated ethylene/alpha-olefin copolymer or an ethylene/alpha-olefin/polymer terpolymer. The bonding is accomplished through the use of a fabric-treating adhesive mixture consisting essentially of an aqueous dispersion of a phenol-formaldehyde resin and a high-unsaturation terpolymer. The terpolymer is composed of the following monomers in the amounts given, based on total weight of the terpolymer: ethylene, from about 20% to 65%; propylene, from about 5% to 20%; a cyclic or acyclic polyene having nonconjugated double bonds, from about 30% to 60%.

The process of the present invention comprises: (1) treating the fibers with the aforesaid adhesive mixture until the fibers have absorbed an amount of solids between about 5% and 20% by weight of the fibers; (2) drying the treated fibers to constant weight; (3) assembling the dried fibers in contact with the aforesaid vulcanizable composition; and then (4) heating the assembled articles to a temperature from about 100° to 240° C., thereby vulcanizing the composition and bonding the fibers thereto.

The treatment of the fiber with the adhesive mixture can be effected either by coating or by immersion of the fiber in the adhesive mixture.

The natural or synthetic fibers which can be bonded to the elastomers in accordance with the present invention include rayon, nylon, polyesters, cellulose fibers and the like, in the form, for example, of filaments, pluri-filaments, cords or fabrics.

The vulcanizable elastomeric compositions may contain either a saturated copolymer of ethylene and an alpha-olefin or a low-unsaturation terpolymer of ethylene, an alpha-olefin and a cyclic or acyclic nonconjugated polyene. The alpha-olefin monomers which may be incorporated in the elastomers include propylene and 1-butene. The saturated ethylene/alpha-olefin copolymers suitable for the present invention contain from about 20% to 80% by moles of ethylene monomer and have average molecular weight from about 50,000 to 800,000, and preferably between 60,000 and 500,00. The appropriate vulcanizing agents for these copolymers include mixtures of organic peroxides with free radical acceptors such as sulfur, quinonedioxime, or triallylcyanurate.

The low-unsaturation terpolymers suitable for the present invention contain as a third monomer a nonconjugated cyclic or acylic polyene, for example: 1,5-cyclooctadiene; dicyclopentadiene; norbornadiene; methylenenorbornene; 6-methyl- 4,7,8,9 - tetrahydroindene; 5,6-dimethyl - 4,7,8,9 - tetrahydroindene; 1,4-hexadiene; 4,8-dimethyl - 1,4,9 - decatriene; 1,4 - cyclooctadiene; 1,6-cyclododecadiene; 1,6-heptadiene; 2-methyl-pentadiene; and 1,5,9-cyclododecatriene. The terpolymers are commonly prepared using catalysts based on compounds of transition metals, particularly vanadium, and organic aluminum compounds and have average molecular weight from about 5,000 to 800,000 and preferably between 60,000 and 500,000. They contain from about 20% to 80% by moles of ethylene monomer and from about 0.1% to 18% by moles of the polyene and are vulcanized with systems based on sulfur and accelerators or on organic peroxidic agents.

The new high - unsaturation ethylene/alpha-olefin/polyene terpolymers for use in the adhesive mixture of the present invention contain as monomers ethylene, propylene, and a member of the class of polyenes described above. When a low-unsaturation terpolymer is used in the vulcanizable composition, it is not necessary that the polyene in the high-unsaturation terpolymer be the same as the polyene in the low-unsaturation terpolymer. The significant difference between the two terpolymers, however, is in the relative amounts of the monomers in each.

The new high-unsaturation terpolymers should preferably contain the smallest amount of propylene sufficient to produce a terpolymer which is soluble in hydrocarbons. It is necessary to employ such a terpolymer, however, rather than an ethylene-/polyene copolymer, since it has been found that such copolymers often are insoluble and therefore unsuitable for latex formation. In general a content of 5% to 20% by weight of propylene will be sufficient to give the desired solubility. The polyene should be present in the terpolymer in amounts from 30% to 60% by weight.

Mooney viscosity values ML (1+4) at 100° C. should be higher than 50, and values above 60 are preferred for said terpolymers, although lower values also sometimes give satisfactory adhesion values in accordance with the present invention.

The high-unsaturation terpolymers may be obtained with the same catalytic systems and the same techniques employed for the preparation of low-unsaturation terpolymers.

The terpolymer latex is prepared by known processes analogous to those utilized for the preparation to latexes of low-unsaturation terpolymers, optionally modified, starting with a hydrocarbon solution of the polymer and forming an aqueous dispersion thereof with a surface active agent, adding creaming agents such as carboxy methyl cellulose, and, finally, distilling off the solvent and concentrating the latex until the solids content reaches the desired level, between 10 and 40%.

The adhesive mixture for the fiber treatment is prepared by mixing the latex of high-unsaturation terpolymer with an aqueous dispersion of resorcinol-formaldehyde resin, adjusting the pH of the medium to about pH 7–8, and buffering the mixture at that pH, for instance with a $H_3BO_3$/NaOH buffer system.

In the adhesive mixture, the weight ratio of resorcinol to terpolymer should be between about 1:1 and 1:3, while the molar ratio of resorcinol to formaldehyde should be between about 1:1 and 2:1.

After the adhesive mixture has been matured for from 20 to 80 hours, the natural or synthetic fibers are treated with the mixture by known methods, so that the fabric takes up an amount of solids from the dispersion between about 5% and 20% of the weight of the fabric.

The final adhesion is achieved by bringing into contact the treated and dried fabric and the vulcanizable elastomeric composition and heating the articles thus assembled to a temperature of 110–240° C. for the time required to perform the vulcanization. The vulcanizable composition may optionally contain any additional substances normally employed in the compounding of elastomers, including extender oils, plasticizers, reinforcing fillers, antioxidants, and pigments.

By way of example the following is a description of the preparation of a latex based on the high-unsaturation terpolymer.

To an aqueous solution of emulsifiers consisting of 7.5 g. of octylphenolpolyoxymethylate (Triton X–100) and 0.75 g. of sodium lauryl sulfate per liter of water, an equal volume of heptane solution containing 3–5% of the high-unsaturation terpolymer is added while vigorously stirring (Kothoff turboagitator); after 30 minutes of agitation, 1 g. of carboxymethylcellulose is added per liter of water in the emulsion.

After 10 minutes more of stirring, the emulsion is transferred to a separatory funnel where part of the excess water separates in 24 hours. The remainder of the suspension is placed in a three-neck flask, and the solvent is distilled off in a current of nitrogen, under slight vacuum and with continuous stirring, while heated on a water bath at a temperature not exceeding 65–70° C. When all the solvent has been removed the latex is concentrated further by heating with stirring at 65°–70° C. to concentrate the terpolymer up to about 30–40%.

The high-unsaturation terpolymer was prepared for example as follows:

7 liters of heptane, 1.8 liters of propylene and 5 liters of 6-methyl-4,7,8,9-tetrahydroindene are introduced into a 20 liter stainless steel autoclave equipped with a stirrer, and jacket-cooled by means of ammonia expansion; it is saturated with ethylene and a pressure of 1.8 atm. maintained therewith, at a temperature of −10° C. 12.3 grams of aluminum diethyl monochloride dissolved in heptane and 4.6 grams of vanadium triacetylacetonate dissolved in toluene are used as catalyst. The solution of said catalyst components, having an Al/V ratio of 7.5, is divided into 5 parts that are introduced into the autoclave at regular intervals during a period of 40 minutes. The whole reaction lasts 90 minutes. The polymeric solution is then discharged from the autoclave and the solvent removed by stripping with steam. The coagulated polymer is dried in an oven at 60° C. under a nitrogen current.

In all of the following examples, the adhesive measurements were carried out by the peeling method of ASTM D–413/39.

EXAMPLE 1

A rayon cord fabric (warp=25 threads per cm., weft= 9 threads per cm.) was coated using a paint-brush with various adhesive mixtures containing ethylene/propylene/ 6 - methyl - 4,7,8,9 - tetrahydroindene (6 - MTHI) terpolymers having the monomer compositions shown in Table 1 and then dried at about 150° C. The adhesive mixture, prepared as described above, had the following composition:

|   | G. |
|---|---|
| Distilled water | 19 |
| Resorcinol | 2.2 |
| Formalin (40%) | 2.27 |
| Buffer solution | 2 |
| Terpolymer latex (23% solids) | 20 |

NaOH (10%) to bring pH of mixture up to pH 8.
Resorcinol/formaldehyde ratio (by moles)=1:1.5.
Resorcinol/terpolymer ratio (by weight)=1:2.
Weight increase of coated and dried fabric: 7%.

The composition of the buffer solution was as follows:

|   | G. |
|---|---|
| Distilled water | 100 |
| $H_3BO_3$ | 1.24 |
| NaOH | 0.24 |

The fabric thus coated was assembled according to ASTM D–413/39 with the following elastomeric composition:

|   | Parts by weight |
|---|---|
| Terpolymer:ethylene/propylene 42% (mole)/6-methyl - 4,7,8,9 - tetrahydroindene, 1% (mole) [ML (1+4) 100° C.=100] | 65 |
| Branched polyalkylbenzene (specific gravity=0.880; $\eta$=5.6° E. at 50° C.) (Preadix 8) | 35 |
| Carbon black HAF | 30 |
| Zinc oxide | 5 |
| Phenylbetanaphthylamine | 1 |
| Mercaptobenzthiazole | 0.5 |
| Tetramethylthiouram disulfide | 1 |
| Sulfur | 2 |

Vulcanization: 150° C., 60 minutes.

Table 1 reports the adhesion values of the fiber-vulcanized terpolymer composition measured at 25° and 90° C. Examples 1.1 to 1.6 are within the scope of the present invention. Examples 1.7 to 1.11 show the inferior results obtained by using in the adhesive mixture a terpolymer which is not in accord with the present invention.

TABLE 1.—ADHESION OF VULCANIZED ELASTOMERIC COMPOSITION TO RAYON FABRIC USING VARIOUS ETHYLENE/PROPYLENE 6-MTHI TERPOLYMERS IN ADHESIVE MIXTURE

| | Adhesive mixture | | | | | |
|---|---|---|---|---|---|---|
| | Terpolymer | | | | Adhesion (peeling method) [kg./cm.] | |
| Example No. | ML (1+4) 100° C. | 6-MTHI, wt. percent | Propylene, wt. percent | Maturation, hr. | | |
| Temperature of adhesion test | | | | | 25° C. | 90° C. |
| 1.1 | 55 | 30 | 17 | 0 | 4.1 | 2.2 |
| | | | | 24 | 12 | 7.4 |
| | | | | 48 | 14 | 7.5 |
| | | | | 72 | 9.1 | 4.3 |
| 1.2 | 50 | 45 | 16 | 0 | 4.6 | 2.5 |
| | | | | 24 | ¹16 | 9.2 |
| | | | | 48 | ¹16 | ¹9.4 |
| | | | | 72 | 12.3 | 5 |
| 1.3 | 80 | 35 | 20 | 0 | 2.7 | 1.6 |
| | | | | 24 | 6.5 | 3.5 |
| | | | | 48 | 11.5 | 5.7 |
| | | | | 72 | 11 | 5.5 |
| 1.4 | 60 | 45 | 15 | 0 | 5 | 2.7 |
| | | | | 24 | ¹18 | ¹10 |
| | | | | 48 | ¹18 | ¹10 |
| | | | | 72 | 14 | ¹7 |
| 1.5 | 120 | 53 | 12 | 0 | 2.8 | 1.75 |
| | | | | 24 | ¹18 | ¹9.5 |
| | | | | 48 | ¹18 | ¹9.5 |
| | | | | 72 | 14.5 | ¹7.5 |
| 1.6 | 120 | 57 | 12 | 0 | 3 | 1.7 |
| | | | | 24 | ¹18 | ¹10 |
| | | | | 48 | ¹18 | ¹9.5 |
| | | | | 72 | 15 | ¹8 |
| 1.7 | 113 | 3.5 | 40 | 0 | 2 | 1 |
| | | | | 24 | 1.8 | 0.8 |
| | | | | 48 | 1.75 | 0.5 |
| | | | | 72 | 1.7 | 0.9 |
| 1.8 | 60 | 15 | 25 | 0 | 2.2 | 1 |
| | | | | 24 | 3.7 | 1.7 |
| | | | | 48 | 5.5 | 3 |
| | | | | 72 | 6.5 | 3.2 |
| 1.9 | 31 | 23 | 20 | 0 | 1.8 | 0.5 |
| | | | | 24 | 1.8 | 0.9 |
| | | | | 48 | 1.5 | 0.7 |
| | | | | 72 | 1.8 | 0.5 |
| 1.10 | 40 | 35 | 18 | 0 | 2 | 1.1 |
| | | | | 24 | 3.5 | 1.7 |
| | | | | 48 | 4.5 | 2.5 |
| | | | | 72 | 4.5 | 2.5 |
| 1.11 | 31 | 44 | 15 | 0 | 2.8 | 1.7 |
| | | | | 24 | 4.7 | 2.2 |
| | | | | 48 | 6.7 | 3.5 |
| | | | | 72 | 8 | 4 |

¹ The value of the fiber-to-rubber adhesion is higher than the value of tear resistance of the adhering mixture.

EXAMPLE 2

Cord fabrics of nylon (warp=11 threads per cm., weft=5 threads per cm.) and of cotton (warp=13 threads per cm., weft=10 threads per cm.) were coated with an adhesive mixture of the composition described in Example 1 and containing a latex of ethylene/propylene/6-methyltetrahydroindene terpolymer prepared from the terpolymer of Example No. 1.5 above. The coated fabrics were then dried at about 150° C. The weight increase of coated and dried fabrics was 7.5%.

The coated fabrics were then assembled with the elastomeric composition of Example 1. Vulcanization: 150° C., 60 minutes.

Table 2 reports the values of adhesion of the different fibers to the vulcanized mixture, as measured at 25° C. and 90° C.

TABLE 2.—ADHESION OF VULCANIZED ELASTOMERIC COMPOSITION TO NYLON AND COTTON FABRICS USING ADHESIVE MIXTURE OF EXAMPLE 1.5

| Example No. | Cord fabric | Adhesive mixture maturation, hr. | Adhesion (peeling method) [kg./cm.] | |
|---|---|---|---|---|
| Temperature of adhesion test | | | 25° C. | 90° C. |
| 2.1 | Nylon | 0 | 3.0 | 1.2 |
| | | 24 | 14.2 | ¹ 7.5 |
| | | 48 | ¹ 17.5 | ¹ 9.5 |
| | | 72 | ¹ 17.0 | ¹ 10.0 |
| 2.2 | Cotton | 0 | 3.2 | 1.3 |
| | | 24 | 7.5 | 4.0 |
| | | 48 | 14.0 | ¹ 8.5 |
| | | 72 | 13.5 | ¹ 8.5 |

¹ The value of the fiber-to-rubber adhesion is higher than the value of tear resistance of the adhering mixture.

EXAMPLE 3

A rayon cord fabric as described in Example 1 was treated by coating with an adhesive mixture comprising a latex of ethylene/propylene/6 - methyl - 4,7,8,9 - tetrahydroindene terpolymer having the composition described in Example 1.5. The weight increase of treated and dried fabric was 7%. The fabric thus treated was brought into contact with elastomeric compositions A, B, and C, compounded as described in Example 1 but substituting in place of the low unsaturation ethylene/propylene/6-methyl-4,7,8,9-tetrahydroindene terpolymer, the terpolymers described in Table 3. Vulcanization: 150° C., 60 minutes.

Table 3 reports the values of the adhesion between the rayon fabric and the different elastomeric compositions, measured at 25° and 90° C.

NaOH (10%) to bring pH of mixture up to pH 8.
Resorcinol/formaldehyde ratio (by moles)=1:1.5.
Resorcinol/terpolymer ratio (by weight)=1:2.
[Weight increase of treated and dried fabric: 8%]

The fabric was then assembled with the elastomeric composition of Example 1. Vulcanization: 150° C., 60 minutes.

Table 4 reports the adhesion values between the elastomeric terpolymer and the rayon fabric, measured at 25° and 90° C.

TABLE 4.—ADHESION OF VULCANIZED ELASTOMERIC COMPOSITION TO RAYON FABRIC USING ETHYLENE/PROPYLENE DICYCLOPENTADIENE TERPOLYMER IN ADHESIVE MIXTURE

| Example No. | Adhesive mixture maturation, hr. | Adhesion (peeling method) [kg./cm.] | |
|---|---|---|---|
| Temperature of adhesion test | | 25° C. | 90° C. |
| 4.1 | 0 | 3.6 | 1.7 |
| | 24 | 7.5 | 4.0 |
| | 48 | 10.5 | ¹ 5.0 |
| | 72 | 11.0 | ¹ 5.5 |

¹ The value of the fiber-to-rubber adhesion is higher than the value of tear resistance of the adhering mixture.

EXAMPLE 5

A rayon cord fabric as described in Example 1 was treated by coating with an adhesive mixture including a latex of ethylene/propylene/6-methyl-4,7,8,9-tetrahydroindene terpolymer. The terpolymer was prepared from 15% by weight of propylene and 45% by weight of 6-methyl-4,7,8,9-tetrahydroindene, and had a Mooney viscosity ML (1+4) 100° C.=60. The adhesive mixture TABLE 3.—ADHESION OF VULCANIZED ELASTOMERIC COMPOSITION CONTAINING VARIOUS TERPOLYMERS OF RAYON FABRIC USING ADHESIVE MIXTURE OF EXAMPLE 1.5

| Example No. | Elastomeric terpolymer | | | Adhesive maturation, hr. | Adhesion (peeling method) [kg./cm.] | |
|---|---|---|---|---|---|---|
| | ML (1+4) 100° C. | Polyene, mole percent | Alpha-olefin, mole percent | | | |
| Temperature of adhesion test | | | | | 25° C. | 90° C. |
| 3.1 | 80 | 1,4-hexadiene, 1.35% | Propylene, 36% | 0 | 2.5 | 1.2 |
| | | | | 24 | 4.5 | 2.2 |
| | | | | 48 | 8.0 | 4.5 |
| | | | | 72 | 10.0 | ¹ 5.0 |
| 3.2 | 130 | Dicyclopentadiene, 1.7% | Propylene, 29% | 0 | 3.0 | 1.5 |
| | | | | 24 | 5.5 | 2.7 |
| | | | | 48 | ¹ 11.0 | ¹ 5.5 |
| | | | | 72 | ¹ 11.0 | ¹ 5.5 |
| 3.3 | 90 | Methylenenorbornene, 0.98% | Propylene, 32.8% | 0 | 2.5 | 1.2 |
| | | | | 24 | 6.0 | 3.0 |
| | | | | 48 | ¹ 9.0 | ¹ 5.0 |
| | | | | 72 | ¹ 9.5 | ¹ 5.0 |

¹ The value of the fiber-to-rubber is higher than the value of tear resistance of the adhering mixture.

EXAMPLE 4

A rayon cord fabric as described in Example 1 was treated by coating with an adhesive mixture comprising a latex of ethylene/propylene/dicyclopentadiene terpolymer prepared from a terpolymer having a propylene content of 15% by weight and a dicyclopentadiene content of 50% by weight, with Mooney viscosity (1+4) 100° C.=55. The adhesive mixture had the following composition:

|  | G. |
|---|---|
| Distilled water | 10.5 |
| Resorcinol | 1.32 |
| Formalin | 1.98 |
| Buffer solution | 1.25 |
| Terpolymer latex (20% solids) | 13.2 | had the composition described in Example 1. The weight increase of treated and dried fabric was 7.5%.

The fabric was then assembled with the following elastomeric composition containing ethylene/propylene copolymer.

| | Parts by weight |
|---|---|
| Copolymer: [ethylene/propylene, 45% (moles) ML (1+4) 100° C.=25] | 100 |
| Carbon Black HAF | 30 |
| Zinc oxide | 5 |
| Poly 2,2,4-trimethyl-1,2-dihydroquinoline | 0.5 |
| Sulfur | 0.28 |
| Alpha, alpha - bis - (t - butylperoxy)diisopropylbenzene | 1.65 |

Vulcanization: 165° C., 40 minutes.

TABLE 5.—ADHESION OF VULCANIZED ELASTOMERIC COMPOSITION TO ETHYLENE/PROPYLENE COPOLYMER TO RAYON FABRIC

| Example No. | Adhesive mixture maturation, hr. | Adhesion (peeling method) [kg./cm.] | |
|---|---|---|---|
| Temperature of adhesion test | | 25° C. | 90 °C. |
| 5.1 | 0 | 3.2 | 1.25 |
| | 24 | [1] 14.0 | [1] 7.5 |
| | 48 | [1] 13.5 | [1] 7.5 |
| | 72 | [1] 13.0 | [1] 7.0 |

[1] The value for the fiber-to-rubber adhesion is higher than the value of the tear resistance of the adhesive mixture.

EXAMPLE 6

With the latex of ethylene/propylene/6-methyl-4,7,8,9-tetrahydroindene terpolymer as prepared and described in Example 5, an adhesive mixture of the following composition was prepared:

|  | G. |
|---|---|
| Distilled water | 6.6 |
| Resorcinol | 2.2 |
| Formalin (40%) | 1.2 |
| Buffer solution | 6.25 |
| Terpolymer latex (40% solids) | 11 |

NaOH (10%) to bring pH of mixture up to pH 8.

Rayon cord (type 2200/3, 100 square meters) commonly employed in tires, was coated with the above described adhesive mixture.

The fabric was then rubber coated with the elastomeric mixture described in Example 1, and was then used in 5.20/14 2-ply tires. The tread and sidewalls were then manufactured by extrusion through a flat die from the following composition:

| | Parts by weight |
|---|---|
| Terpolymer: ethylene/propylene 42% (moles) 6-methyl - 4,7,8,9 - tetrahydroindene 1% (moles) Mooney viscosity ML (1+4) at 100° C.=100 | 65 |
| Branched polyalkylbenzenes (Preadix 8) | 35 |
| Carbon black ISAF | 55 |
| Zinc oxide | 5 |
| Phenylbetanaphthylamine | 1 |
| Stearic acid | 0.5 |
| Mercaptobenzothiazole | 0.5 |
| Tetramethylthiouram disulfide | 1 |
| Sulfur | 2 |

The tires were vulcanized in a mold with live steam at 15 atmospheres (jacket) for 15 minutes, and were then tested on a high speed test wheel at a speed of 60 km./hour and a load of 600 kg./axle without the slightest loosening of the terpolymer tread from the plies.

Having thus described the invention, what is desired to be secured and claimed by Letters Patent is:

1. A process for bonding a vulcanizable elastomeric composition to a textile fiber comprising:
    (a) impregnating the fiber with an aqueous dispersion comprising:
        (1) a high-unsaturation terpolymer consisting essentially of the following monomeric composition by weight percentage:
            ethylene, from about 20% to 65%;
            propylene, from about 5% to 20%; and
            a nonconjugated cyclic or acyclic polyene, from about 30% to 60%; and
        (2) a phenol and formaldehyde, or a phenol-formaldehyde resin; the weight ratio of phenol to terpolymer being between about 1:1 and 1:3, and the molar ratio of phenol to formaldehyde being between about 1:1 and 2:1; the pH of said aqueous dispersion having been adjusted to and being maintained at an alkaline pH;
    (b) drying the treated fiber;
    (c) placing the treated and dried fiber in contact with a vulcanizable composition comprising:
        (1) an elastomer selected from the group consisting of copolymers of ethylene and an alpha-olefin, and terpolymers of ethylene, an alpha-olefin and a nonconjugated cyclic or acyclic polyene; and
        (2) a vulcanizing agent for the elastomer; and
    (d) vulcanizing the composition.

2. The process of claim 1 wherein the fiber is impregnated with the dispersion by placing the fiber in contact with the dispersion until the fiber has absorbed from about 5% to 20% of solids from the dispersion, based on the weight of the fiber.

3. The process of claim 1 wherein the aqueous dispersion is matured for from about 20 hours to 80 hours after mixing and before impregnating the fiber therewith.

4. The process of claim 1 wherein the adhesive mixture is prepared by mixing:
    (1) a latex of the high-unsaturation terpolymer comprising from about 10% to 40% of terpolymer and dispersing agents, and
    (2) an aqueous dispersion of resorcinol-formaldehyde resin, and then buffering the mixture to a pH from about 7 to 8.

5. The process of claim 1 wherein the vulcanization is accomplished by heating to a temperature of from about 100° to 240° C.

6. The process of claim 1 wherein the high-unsaturation terpolymer has a Mooney viscosity, ML (1+4), at 100° C., greater than about 50 and has an average molecular weight of from about 50,000 to 800,000.

7. The process of claim 1 wherein the polyene monomer of the high-unsaturation terpolymer is a member selected from the group consisting of: 1,5-cyclooctadiene; dicyclopentadiene; norbornadiene; methylenenorbornene; 6-methyl-4,7,8,9-tetrahydroindene; 1,4-hexadiene; 4,8-dimethyl - 1,4,9 - decatriene; 1,4-cyclooctadiene; 1,6-cyclododecadiene; 1,6-heptadiene; 2-methylpentadiene; 1,5,9-cyclododecatriene and 5,6 - dimethyl-4,7,8,9-tetrahydroindene.

8. The process of claim 1 wherein the elastomer is a member selected from the group consisting of:
    copolymers of from about 20% to 80% by moles of ethylene and a member selected from the group consisting of propylene and 1-butene; and
    terpolymers of from about 20% to 80% by moles of ethylene, a member selected from the group consisting of propylene and 1-butene, and from about 0.1% to 18% by moles of a member selected from the group consisting of: 1,5-cyclooctadiene; dicyclopentadiene; norbornadiene; methylenenorbornene; 6-methyl-4,7,8,9-tetrahydroindene; 1,4-hexadiene; 4,8-dimethyl-1,4,9-decatriene; 1,4 - cyclooctadiene; 1,6-cyclododecadiene; 1,6-heptadiene; 2-methylpentadiene; 1,5,9-cyclododecatriene and 5,6-dimethyl-4,7,8,9-tetrahydroindene.

9. The process of claim 1 wherein the fiber is a member selected from the group consisting of rayon, nylon, polyesters and cellulose fibers.

10. The process of claim 1 wherein the fiber is in the form of a woven fabric.

11. A vulcanized product comprising (1) a textile fiber bonded to (2) an elastomeric composition comprising an elastomer selected from the group consisting of copolymers of ethylene and an alpha-olefin, and terpolymers of ethylene, an alpha-olefin and a nonconjugated cyclic or acyclic polyene, wherein the bonding agent comprises
    (a) a high-unsaturation terpolymer consisting essentially of the following monomeric composition by weight percentage:
    ethylene, from about 20% to 65%;
    propylene, from about 5% to 20%; and
    a nonconjugated cyclic or acyclic polyene, from about 30% to 60%; and (b) a phenol-formaldehyde polymer, wherein the weight ratio of phenol to terpolymer is between about 1:1 and 1:3 and the molar ratio of phenol to formaldehyde is between about 1:1 and 2:1.

References Cited

UNITED STATES PATENTS 3,262,482  7/1966  Clifton et al.
3,338,769  8/1967  Kuhlkamp et al.

WILLIAM D. MARTIN, Primary Examiner

R. HUSACK, Assistant Examiner

U.S. Cl. X.R.

117—138.8, 143, 145; 156—110; 161—92, 248, 253

PO-1050
(5/69)

UNITED STATES PATENT OFFICE
CERTIFICATE OF CORRECTION

Patent No. 3,533,831          Dated October 13, 1970

Inventor(s) Luigi Torti and Guido Bertelli

It is certified that error appears in the above-identified patent and that said Letters Patent are hereby corrected as shown below:

Column 3, line 61, "5,000 to 800,000" should read -- 50,000 to 800,000 --. Column 4, line 7, "ethylene-/polyene" should read -- ethylene/polyene --. Column 5, line 68, "Mercaptobenzthiazole" should read -- Mercaptobenzothiazole --.

Signed and sealed this 20th day of April 1971.

(SEAL)
Attest:

EDWARD M. FLETCHER, JR.
Attesting Officer

WILLIAM E. SCHUYLER, JR.
Commissioner of Patents